(12) United States Patent
Yamamoto

(10) Patent No.: US 8,441,553 B2
(45) Date of Patent: May 14, 2013

(54) IMAGER FOR COMPOSING CHARACTERS ON AN IMAGE

(75) Inventor: Yasuhiro Yamamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 273 days.

(21) Appl. No.: 12/612,883

(22) Filed: Nov. 5, 2009

(65) Prior Publication Data

US 2010/0123797 A1 May 20, 2010

(30) Foreign Application Priority Data

Nov. 17, 2008 (JP) .................................. 2008-293280

(51) Int. Cl.
*H04N 5/278* (2006.01)
*G10L 15/26* (2006.01)

(52) U.S. Cl.
USPC .......................................... 348/239; 704/235

(58) Field of Classification Search .... 704/235; 348/239
See application file for complete search history.

(56) References Cited

U.S. PATENT DOCUMENTS

| 7,257,531 B2 * | 8/2007 | Holub ........................... 704/235 |
| 2005/0117044 A1 * | 6/2005 | Suto ........................ 348/333.12 |
| 2010/0238323 A1 * | 9/2010 | Englund ....................... 348/239 |

FOREIGN PATENT DOCUMENTS

| JP | 10-319493 | 12/1998 |
| JP | 11055614 A * | 2/1999 |
| JP | 11-352988 | 12/1999 |
| JP | 2006030874 A * | 2/2006 |

OTHER PUBLICATIONS

"Embedded Via Voice"; http://www-01.ibm.com/software/pervasive/embedded_viavoice/about/?S_CMP=mav, pp. 1-7.

* cited by examiner

*Primary Examiner* — Jason Whipkey
(74) *Attorney, Agent, or Firm* — Greenblum & Bernstein, P.L.C.

(57) ABSTRACT

An imager is provided having an image-capturing device, a voice detector, a voice recognition device and a composer. The image-capturing device captures a subject image and outputs an image. The voice detector detects ambient sound. The voice recognition device converts the ambient sound to characters. The composer composes the characters into the image.

8 Claims, 5 Drawing Sheets

IMAGER FOR COMPOSING CHARACTERS ON AN IMAGE

BACKGROUND OF THE INVENTION

1. Field of the Invention

The present invention relates to an imager that composes characters recognized by voice recognition onto a captured image.

2. Description of the Related Art

A camera that can record character strings as magnetic data in a magnetic area of film is disclosed in Japanese Unexamined Patent Publication (KOKAI) No. (Hei)10-319493. A user inputs character strings into a camera before photographing, and selects a character string according to a photographed image. A camera associates the selected character strings with a photographed image, and stores them into film.

However, according to the construction that selects a character string among previously input character strings, a character string that a user desires may not exist among the previously input character strings. In this case, if a user inputs a character string after photographing, the user may miss the next photo opportunity.

SUMMARY OF THE INVENTION

An object of the present invention is to provide an imager that can record a character string desired by a user easily into an image.

An imager is provided having an image-capturing device, a voice detector, a voice recognition device and a composer. The image-capturing device captures a subject image and outputs an image. The voice detector detects ambient sound. The voice recognition device converts the ambient sound to characters. The composer composes the characters into the image.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
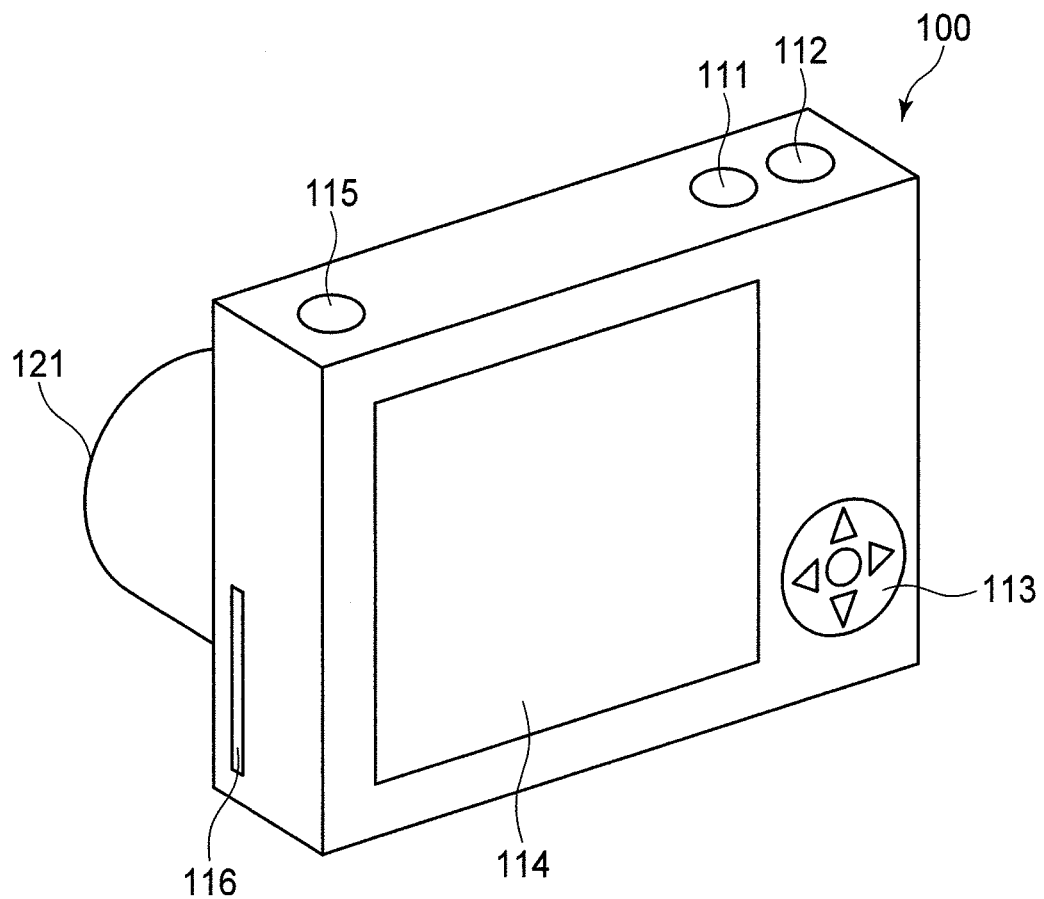
FIG. 1 is a perspective view of the back of the imager according to the embodiment of the present invention.
Figure 2:
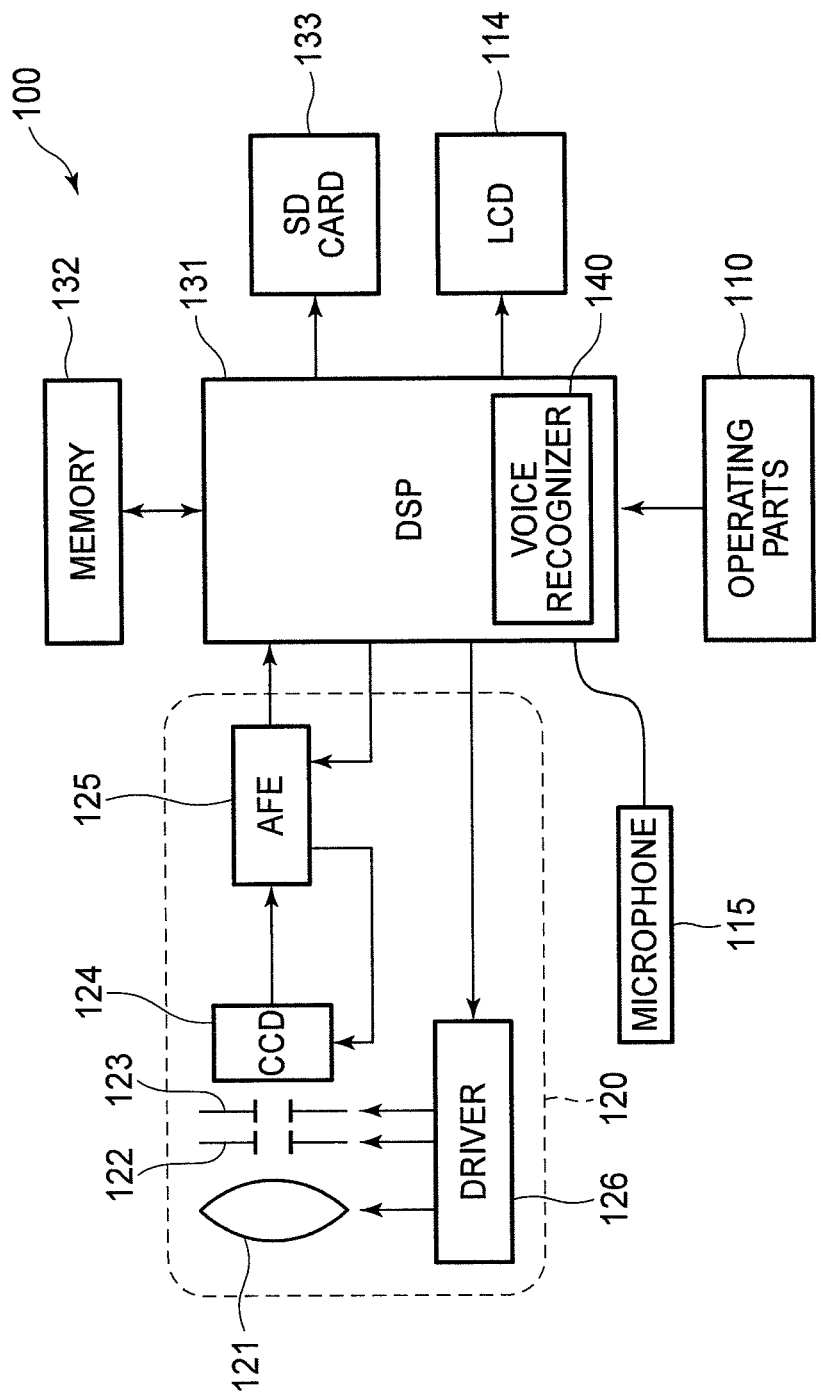
FIG. 2 is a block diagram of the imager.

The present invention is described below with reference to the embodiment shown in the drawings.

A digital camera 100, which is an imager according to the embodiment, is described with reference to FIGS. 1 to 4. The digital camera 100 is, for example, a compact camera.

The digital camera 100 mainly comprises a DSP 131 that controls the digital camera 100, an operating part 110 that is used to operate the digital camera 100, a photographing member 120 that converts a subject image to a digital signal, a microphone 115 that converts ambient sound outside of the digital camera 100 to an electric signal, a memory 132 that stores data sent from the DSP 131, an SD card 133 that stores photographed images, and an LCD 114 that displays photographing conditions and photographed images.

The photographing member 120 mainly comprises a photographing lens 121, a shutter 123, an aperture 122, a CCD 124, an AFE (Analog Front End) 125, and a driver 126 that drives the photographing Lens 121, the shutter 123 and the aperture 122.

The driver 126 controls the position of the focusing system of the photographing lens 121 so that focus of the photographing lens 121 is adjusted so as to form a subject image on an imaging area of the CCD 124. The aperture 122 controls a beam of light running from the photographing lens 121 to the CCD 124 so as to control the amount of light that a subject image forms on the imaging area. The shutter 123 controls time periods among which a subject image is illuminated on the imaging area. The CCD 124 converts a subject image focused onto the imaging area to an analog image signal, and sends it to the AFE 125. The AFE 125 adjusts the gain and other aspects of an analog image signal before converting it to a digital image signal and sending it to the DSP 131. The driver 126 controls the position of the focusing system, size of the aperture 122, and shutter speed according to signals sent from the DSP 131.

The DSP 131 measures the light amount of a subject that is included in a digital image signal it receives from the AFE 125. The DSP 131 calculates an exposure value using the measured light amount, and calculates a shutter speed and aperture value, i.e., F-number, based on the exposure value. Afterwards, it sends the shutter speed and F-number to the driver 126. Moreover, it determines the position of the focusing system using the digital image signal, and sends the position of the focusing system to the driver 126. The DSP 131 also adjusts the white balance of the image before sending the adjusted image as a through image to the LCD 114. The through image consists of multiple still images and is perceived to be a moving image by users.

During photographing, the DSP 131 processes an image from a digital image signal and creates a photographed image. The photographed image is stored in the SD card 133 and displayed on the LCD 114. The memory 132 is used as a working memory to temporarily store data when the DSP 131 executes these calculations and processes an image.

The DSP 131 executes a face detecting process. The face detecting process detects position and dimensions of a face included in the photographed image created from the digital image signal. The detected position and dimensions of the face are indicated in the through image using an indicating frame. The DSP 131 calculates an exposure value with respect to the detected face, and adjusts the white balance of the image. Therefore, a photographed image is created such that its focus and exposure are properly adjusted with respect to the detected face. In the case that the face detecting process detects more than one face, the DSP 131 selects only one face as a main subject among the indicated detected faces using indicating frames, calculates an exposure value for the selected face, and adjusts the white balance of an image. Note that the main subject is very likely to be the subject that a user aims at with the digital camera 100.

The DSP 131 comprises a voice recognition device 140 that executes a voice recognition process. The voice recognition device 140 comprises a sampler 141 that receives sound signals from the microphone 115, a recognizing part 142 that executes voice recognition, a voice recognition memory 143 that is used as working memory, a text processor 144 that converts text data produced by the recognition of human voices to text shapes, a composer 145 that composes text shape data and image data, a menu setting part 146 that detects a recognition language used for voice recognition, and a mode setting part 147 that detects the photographing mode of the digital camera 100.

The voice recognition device 142 executes voice recognition in which it detects human voices within the ambient sound and converts the human voices to characters.

The voice recognition memory 143 temporarily stores digital sound signals that are sampled by the sampler 141 and voice recognition dictionary data prepared for each language. The text shape data are a particular type of image data representing various different shapes of text. The voice recognition dictionary data indicates relationships between digital sound signals and text data, and defines text data that have high probabilities for each photographing mode. Therefore, the recognition rate of voices is improved. The recognition language and the photographing mode is determined by a user operating a mode setting button 113 that is described hereinafter.

The LCD 114 has a rectangular screen with an aspect ratio of 3 to 4, which is the same as a photographed image. The LCD 114 is provided on the center of the back side of the digital camera 100 such that its longitudinal direction extends parallel to the longitudinal (left to right) direction of the digital camera 100. Images captured through the photographing lens 121, photographed images, through images, and a variety of configuration data regarding the digital camera can be displayed on the LCD 114. The through image is sent from the DSP 131. (See FIG. 1)

The operating part 110 has a main power button 111, a release button 112, and a mode setting button 113.

The main power button 111 is a push switch projecting from the top of the digital camera 100. The digital camera 100 is powered when a user depresses the main power button 111. The digital camera 100 is powered-off when a user depresses the main power button 111 while the digital camera 110 is powered.

The release button 112 is two-stage push switch provided at the top surface of the digital camera 100. The digital camera 100 executes photometry, distance surveying, and focusing when a user depresses the release button 112 halfway. Otherwise, when the release button 112 is fully depressed the digital camera 100 captures an image.

The mode setting button 113 is a rocker switch provided on the back of the digital camera 100. When a user depresses the mode setting button 113, the operating state of the digital camera 100 is set to the photographing-mode setting state so that the LCD 114 displays a dialog for setting the photographing mode.

A user operates the mode setting button 113 so as to select a desired photographing mode from among multiple photographing modes, such as pet mode and landscape mode, displayed on the LCD 114. The pet mode is suitable for photographing small animals which may be pet animals. The landscape mode is suitable for photographing distant scenery and a very large range.

Various functions of the digital camera, for example a voice recognition function, are validated or invalidated by a user operating the mode setting button 113. The voice recognition function superimposes words recognized during a period that extends from shortly before photographing to shortly after photographing into a desired position of a photographed image, and then stores the superimposed image.

A language setting of the digital camera 100 can be changed by a user operating the mode setting button 113. When a user changes an operating mode of the digital camera 100 to the language setting mode, a language selecting dialog is displayed on the LCD 114 (refer to FIG. 4). When a user operates the operating part 110 on the language selecting dialog, a list of available languages comprising, for example, Japanese, English, Italian etc., are displayed on the LCD 114. A user can selects a desired language from the displayed list. The selected language is used for voice recognition.

The SD card 133 is detachably stored in a card slot 116 that is provided on the side of the digital camera 100. A user can access and change the SD card 133 from the outside of the digital camera 100.

The microphone 115, which is provided on the top of the digital camera 100, converts ambient sound of the digital camera 100 to a digital sound signal and sends it to the DSP 131.

Figure 3:
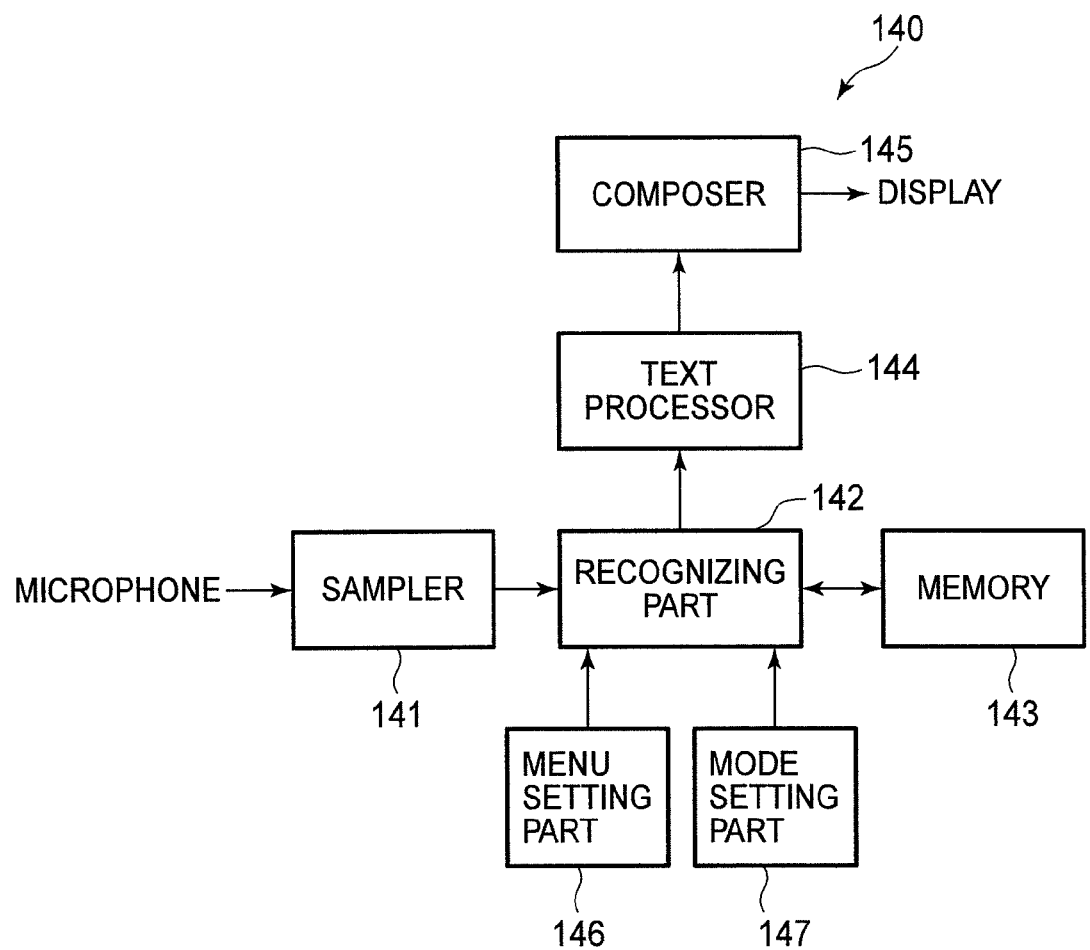
FIG. 3 is a block diagram of a voice recognition device.
Figure 4:
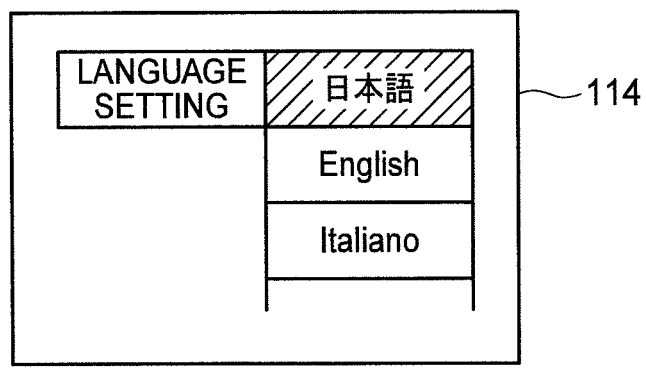
FIG. 4 is a language selecting dialog.
Figure 5:
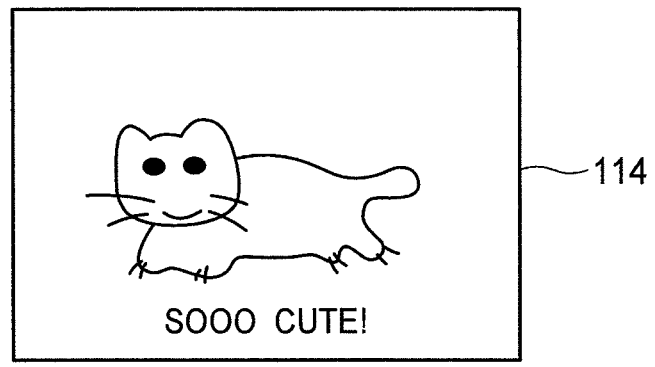
FIG. 5 is an image created by a voice recognition process.

The voice recognition process is described hereinafter with reference to FIGS. 3 to 5.

The voice recognition process is executed in the case that the voice recognition function is validated and a through image is displayed on the LCD 114.

The Photographing mode is confirmed by accessing the mode setting part 147. Next, the recognition language is confirmed by accessing the menu setting part 146. In this embodiment, for example, the photographing mode is set to pet mode and the recognition language is set to English.

The sampler 141 samples ambient sounds that it receives from the microphone 115, converts the sounds to digital sound signals, then sends the digital sound signals to the recognizing part 142. When a user pronounces "Sooo Cute!" for example, the sound of "Sooo Cute!" is sent to the recognizing part 142 as a digital sound signal.

The recognizing part 142 receives a digital sound signal and converts it to text data by referring to the voice recognition dictionary data stored in the voice recognition memory 143. The voice recognition dictionary data used in this process corresponds to the voice data recognition language selected by a user using the language selecting dialog, and is selected from the voice recognition dictionaries stored in the voice recognition memory 143. In the conversion to text data, an algorithm suitable for the voice data recognition language is used. The voice recognition dictionary data stores the words "Sooo Cute!" because they may be frequently used when a user photographs a pet. Therefore, the voice of "Sooo Cute!" may be easily recognized. Afterwards, the text data is sent to the text processor 144. In this process, the voice recognition memory 143 is used as a working memory of the recognizing part 142. Therefore, the digital voice signal of "Sooo Cute!" is converted to "Sooo Cute!" in text data and then sent to the text processor 144.

In the case that the photographing mode is set to the landscape mode and the voice data recognition language is set to English, the voice recognition dictionary data stores words such as "Beautiful" or "Wonderful" that may be frequently used when a user takes photographs.

The text processor 144 converts the text data to the text shape data, and send the text shape data to the composer 145. Therefore, the "Sooo Cute!" text data is converted to an image.

The composer 145 composes the text shape data with the through image, and sends the composed through image to the LCD 114. The LCD 114 displays the composed through image (refer to FIG. 5).

The text data may overlap for a face that is determined to be the main photographing subject during the face recognition process. In such case, the angle of view is changed according to the number of letters of the text data, size of the text shape data, or size of a face in a through image so that the area overlaid with the text shape data is preserved. Note that the size of the text shape data may be changed in such case.

Therefore, the text shape data is overlaid without overwrapping a main photographing subject even if there are a large number of letters in the text data.

Afterwards, when the release button 112 is fully depressed, the composer 145 creates a composed photographing image by composing the text shape data with a photographing image. Then, the DSP 131 stores the composed photographing image in the SD card 133 (refer to FIG. 5).

According to this embodiment, the digital camera easily and quickly records desired characters into a photographed image. Moreover, it properly converts voices to characters because it recognizes them according to photographing mode and a voice data recognition language of the digital camera 100.

Note that voice recognition may not be executed according to both the set language and photographing modes, but may be executed according to either one of them without the other, or neither of them.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2008-293280 (filed on Nov. 17, 2008), which is expressly incorporated herein, by reference, in its entirety.

The invention claimed is:

1. An imager that operates with a photographing mode determined based on an input from a user, the imager comprising:
   - an image-capturing device that captures a subject image and outputs an image;
   - a memory that stores data defining, for the photographing mode, words frequently used in the photographing mode;
   - a voice detector that detects ambient sound;
   - a voice recognizer that converts the ambient sound to characters in consideration of the data defining the words frequently used in the photographing mode, stored in the memory; and
   - a composer that composes the characters into the image.

2. The imager according to claim 1, further comprising a release switch that sends a capturing signal to said image-capturing device, said image-capturing device capturing a subject image and outputting an image when said image-capturing device receives the capturing signal, and said voice recognizer converting the ambient sound to characters during a time period before said release switch sends the capturing signal.

3. The imager according to claim 1, further comprising a display that displays a through image captured by said image-capturing device, and said voice recognizer converting the ambient sound that is detected by said voice detector while said display displays the through image.

4. The imager according to claim 3, wherein the composer composes the characters into the through image to obtain a composed through image, and the display displays the composed through image.

5. The imager according to claim 4, further comprising a release switch that sends a capturing signal to said image-capturing device,
   wherein said display displays the composed through image before said release switch sends the capturing signal to said image-capturing device.

6. The imager according to claim 1, further comprising a language configurator that determines which language to be used for voice conversion, and said voice recognizer converts the ambient sound using the language determined by said language configurator.

7. The imager according to claim 1, wherein said voice recognizer detects a human voice in the ambient sound and converts the human voice to characters.

8. The imager according to claim 1, wherein the imager is operable with a plurality of photographing modes,
   the imager further comprising a mode selector that selects one of the plurality of photographing modes based on the input from the user,
   the memory stores data defining the words frequently used in each of the plurality of photographing modes, and
   the voice recognizer converts the ambient sound to characters in consideration of the data defining the words frequently used in the selected photographing mode, stored in the memory.

* * * * *